United States Patent [19]

Tomburo et al.

[11] 4,299,372
[45] Nov. 10, 1981

[54] SPRUE GATE FOR INJECTION MOLDING OF PLASTIC ARTICLES

[75] Inventors: Anthony F. Tomburo, Cranford; Nicholas W. Kachur, Clark, both of N.J.

[73] Assignee: Gibson Associates, Inc., Cranford, N.J.

[21] Appl. No.: 173,390

[22] Filed: Jul. 29, 1980

[51] Int. Cl.³ .................................................. B29F 1/00
[52] U.S. Cl. .................................... 249/107; 425/573
[58] Field of Search ................. 249/107; 425/573, 806

[56] References Cited

U.S. PATENT DOCUMENTS

| | | | |
|---|---|---|---|
| 2,431,349 | 11/1947 | Stacy | 425/573 X |
| 2,799,435 | 7/1957 | Abplanalp | 249/107 X |
| 2,878,517 | 3/1959 | Cramer | 249/107 |
| 2,890,615 | 6/1959 | Lefebvre | 425/573 X |
| 3,568,973 | 3/1971 | Rau et al. | 249/107 |
| 3,764,248 | 10/1973 | Hall | 425/806 R |

Primary Examiner—J. Howard Flint, Jr.
Attorney, Agent, or Firm—Hopgood, Calimafde, Kalil, Blaustein & Judlowe

[57] ABSTRACT

The invention contemplates a sprue-gate configuration embodied in one of the cavity-defining parts of a multiple-part mold for injection molding of plastic articles. At the gate region of sprue discharge into the cavity, the sprue converges into communication with a cluster of restricted-gate orifices which are in closely spaced, angularly distributed relation about the generally central axis of the sprue. The combined area of the restricted-gate orifices may be less than the area of a conventional single-orifice gate serving a cavity of the same size.

14 Claims, 7 Drawing Figures

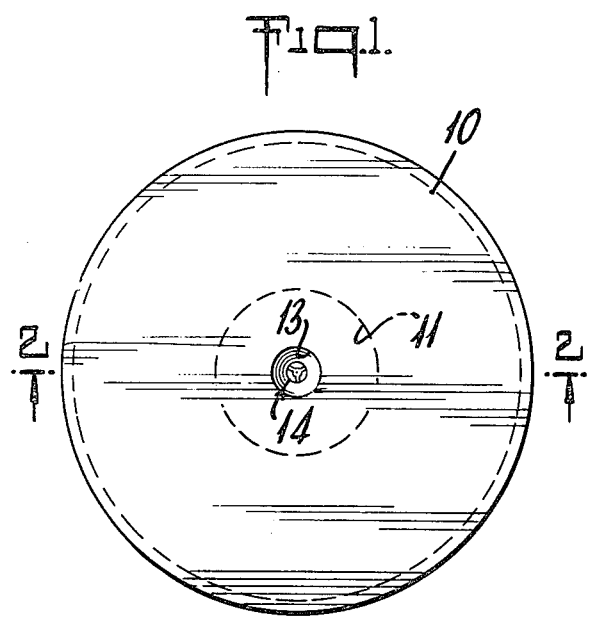
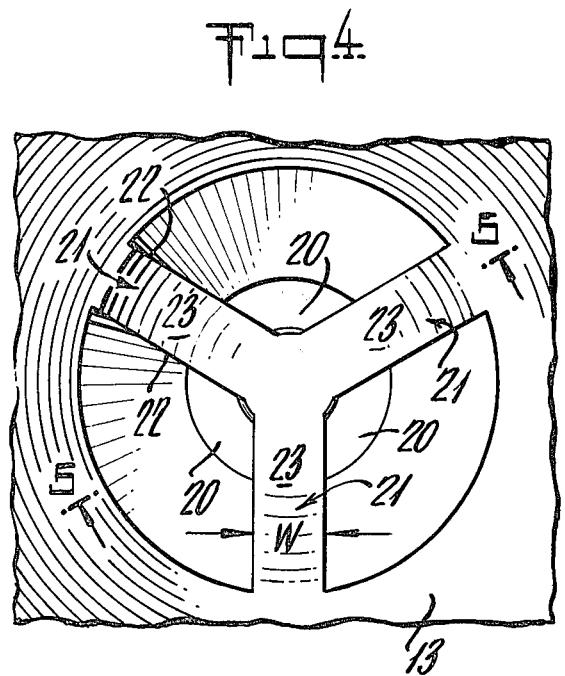
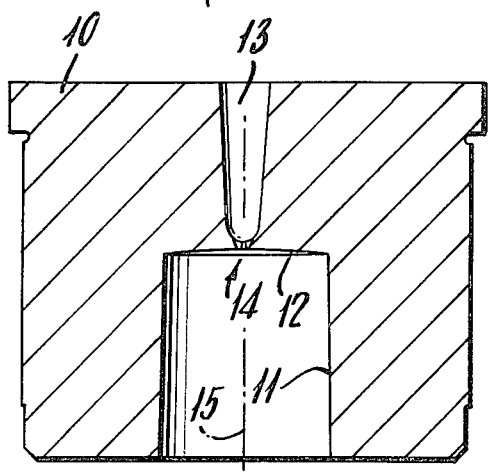
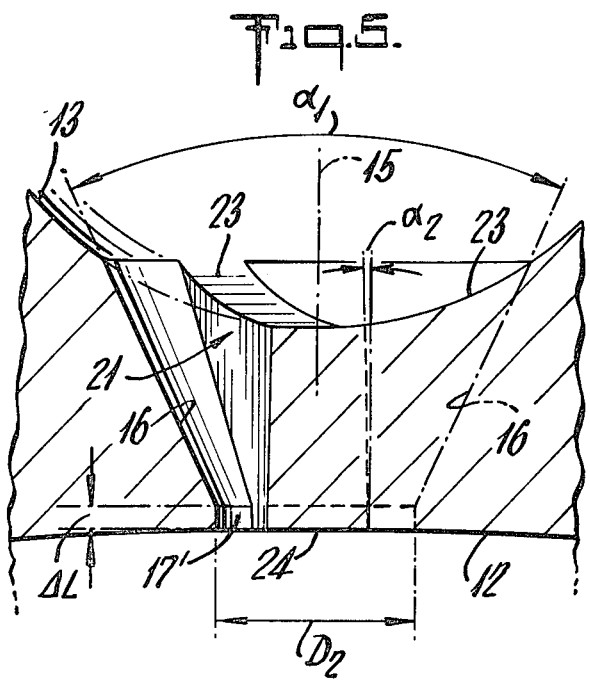
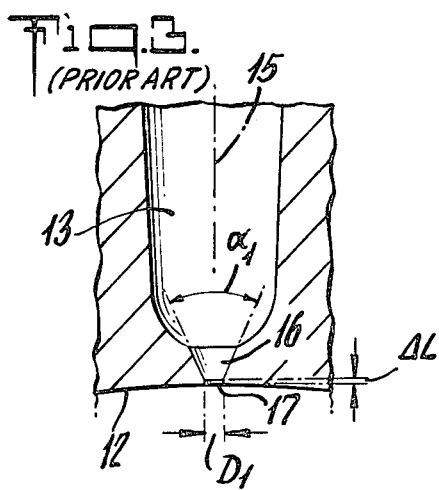

SPRUE GATE FOR INJECTION MOLDING OF PLASTIC ARTICLES

BACKGROUND OF THE INVENTION

The invention relates to a sprue-gate configuration, to serve for injection-molding of plastic articles.

In the injection-molding of such plastic articles as bottle caps, a multiple-part mold defines the cavity into which injection is made via a gate orifice in a sprue passage in one of the mold parts. Usually, as in the bottle-cap case, the gate is located at the center of the cavity wall which defines the external surface of the closed end of the molded cap. But, however restricted the gate orifice with respect to the sprue passage, the molded product is marred by a small pointed projection of plastic, at the point of injection, i.e., at the center of the external surface of the closed end of the product. A conventional technique for improving the appearance of the product is to resort to a secondary operation, e.g., cut-off or grinding, but any secondary operation involves expense that should be avoided, and product appearance may suffer from the secondary operation. An alternate technique is so to configure the product contour with a local recess at the point of injection that, upon product extraction from the mold, the small pointed projection will be contained within the volume of the local recess; but, here again, product appearance must suffer, from lack of a smooth external-surface contour.

BRIEF STATEMENT OF THE INVENTION

It is an object of the invention to provide an improved sprue-gate configuration which will substantially elminate the formation of small pointed projections of the character indicated.

Another object is to meet the above object to the extent that appearance and feel of the molded product at the location of gate injection will be so superior as to be commercially acceptable without resort to secondary operations, and without requiring a local product-surface recess at said location.

A further object is to meet the above objects without impairing productivity of the associated injection-molding machine, and without impairing any aspect of product quality.

The invention achieves the foregoing objects and other features by changing the sprue-gate configuration, from that of a single orifice, to a closely nested cluster of smaller orifices, wherein all of the smaller orifices are preferably at the same eccentric offset from the generally central axis of the cluster. The combined area of the restrictive-gate orifices of the cluster may be less than the area of a conventional single-orifice gate serving a cavity of the same size.

DETAILED DESCRIPTION

A preferred embodiment of the invention will be described in detail, in conjunction with the accompanying drawings, in which:

FIG. 1 is a plan view of a sprue-containing part of a multiple-part mold, for injection-molding of an illustrative bottle-cap product;

FIG. 2 is a sectional view, taken at 2—2 in FIG. 1;

FIG. 3 is an enlarged fragmentary sectional view of a conventional sprue-gate region which previously served a mold part corresponding to that of FIGS. 1 and 2, FIG. 3 being labelled "PRIOR ART";

FIG. 4 is a further-enlarged, fragmentary plan view of the gate region of FIG. 1, as seen from within the associated sprue;

Figure 6:
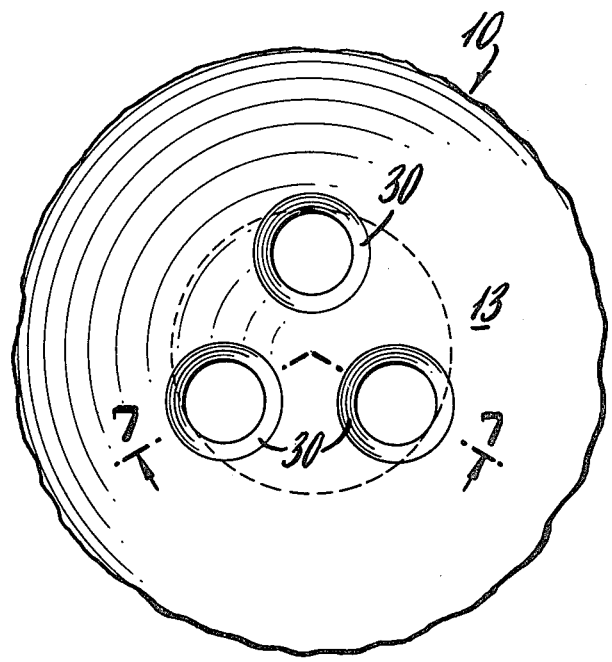
Figure 7:
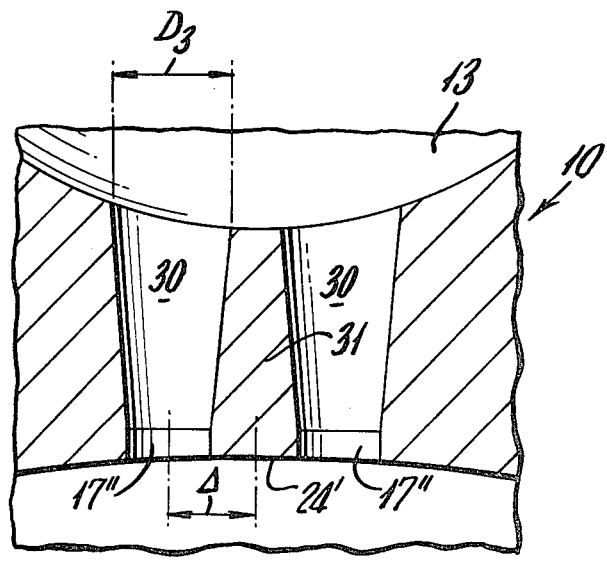

FIG. 5 is a fragmentary sectional view, taken on the radially directed alignment 5—5 of FIG. 4; and FIGS. 6 and 7 are views corresponding to FIGS. 4 and 5, respectively, to show a modification.

In FIGS. 1 and 2, the invention is shown in application to an injection-molding part 10, being one element of a multiple-part mold, illustratively for the injection-molding of a plastic bottle-cap product (not shown). The part 10 is internally recessed and contoured with a downwardly open mold cavity region, characterized (a) by a tapering, almost cylindrical concave surface 11 to establish the outer convex surface of the skirt of the ultimately molded product and (b) by a slightly concave end wall 12 to establish the slightly convex surface of the closure wall of the molded product. When part 10 and its associated other cavity-defining mold parts are mated and clamped in an associated injection-molding machine, injected plastic under elevated pressure enters the mold cavity via a convergent sprue passage 13 and gate region 14 on the axis 15 of the mold cavity. After a curing interval, pressure is relieved, the mold parts are separated, and the molded product is removed from the mold cavity.

In the prior-art gate configuration 14' illustrated in FIG. 3, injected plastic material is funneled through a frusto-conical passage 16 (of convergence angle $\alpha_1$) at the inner rounded end of the sprue passage 13, whence it is discharged into the mold cavity via a short cylindrical passage 17, of the gate or orifice diameter $D_1$, and of length $\Delta L$ which is but a small fraction of the diameter $D_1$. Upon removing a molded product that has been formed with the prior art gate of FIG. 3, a pointed local projection of base diameter $D_1$ remains to mar the otherwise smoothly finished, slightly convex surface of the closure wall of the product, the height of the pointed local projection being at least to the extent $D_1$ above the adjacent closure-wall surface region.

The invention avoids production of such a marring projection by configuring the gate region 14 of FIGS. 1 and 2 as a cluster of smaller orifices at angular spacings about and, therefore, eccentrically offset from the generally central axis 15 of the sprue 13, of gate region 14 and of the mold-cavity surfaces 11–12. Reference is made to FIGS. 4 and 5 for specific detail.

Stated simply, a cluster of like multiple orifices 20 is defined by and between a corresponding number of integrally connected radial struts 21, integrally formed with mold part 10 and within the convergent region 16. Each strut 21 has a pair of flat side walls 22 which are slightly divergent in the direction of injection flow, and the central plane of symmetry for such divergence intersects the central axis 15; the departure of each strut side wall from strict parallelism to the axis 15 is schematically indicated at $\alpha_2$ in FIG. 5. Struts 21 have upstream end surfaces 23 which conform to the spherical contour of the downstream or gate end of the sprue 13; their downstream end surfaces 24 lie geometrically in the surface 12 of the cavity end wall, i.e., below juncture of convergent region 16 with what would otherwise have been the short cylindrical passage 17; passage 17 is thus, in FIG. 5, seen to have been fragmented into three smaller sector passages 17', the outer diameter $D_2$ of which is larger than the diameter $D_1$ of the corresponding prior-art passage (17, in FIG. 3), in view of the eccentric offset which characterizes clustered location of the gate orifices 20.

Upon removing a molded product that has been formed with the gate 14, namely, the gate system of FIGS. 4 and 5, the local points at which gate-retained plastic material separates from the closure wall of the product are totally inconspicuous and can be viewed only with a jeweler's loupe or other magnifier. Thus, there is no objectionable marring of the otherwise smoothly finished, slightly convex surface of the closure wall of the product. At any rate, the molded product of injection through the gate system of FIGS. 4 and 5 is of markedly superior quality and appearance, exhibits absolutely negligible surface roughness at the gated region, and requires no secondary finishing operations.

The described gate system 14 (FIGS. 4 and 5) will be seen to meet all stated objects, enabling mass-production of better products at less cost, due to avoidance of secondary operations. In its initial use, the invention has been applied to a 1-inch long cap product of maximum skirt diameter 0.856 inch. The gate-convergence angle $\alpha_1$ at 16 has remained the 50 degrees previously used, but the prior throat diameter $D_1$ of 0.028 inch has been enlarged to 0.040 inch, at $D_2$. The struts 21 have been three in number, of base width W=0.015 inch, thus defining generally sector-shaped gate orifices 20 of combined throat area a little less than but substantially the same as the area of the FIG. 3 prior art throat (diameter $D_1$).

In use of the invention to date, the described part 10 has been one of a plurality of mold inserts in a multiple-cavity mold system wherein plural duplicate products are produced for each injection cycle of the machine. The part 10, however, has been the only such insert having the gate system 14 (FIGS. 4 and 5). Thus, for each injection cycle of the machine, the improved product was produced along with a regular production run of products of the prior-art sprue gate (FIG. 3). Examination of sprue molded offal removed from the sprue and gate system of the invention, as compared with the sprue-molded offal removed from the sprue and gate system of the prior art (FIG. 3), reveals an inherent ability of the product of the invention to break off much more close to the convex surface profile of the product than is the case for the prior-art system. We believe that this result may be attributed not only to the smaller sectional area of each gate throat, but also (1) to the high proportion of conductive body (10) area contact with material in the gate region 14, per unit volume of material in the gate region 14, as compared with the prior-art system 14', (2) to the fact that struts 23 extend at 24 to the end-wall cavity contour, and (3) to the fact that the solid gate center, by reason of the intersecting struts 23, effectively establishes a plug which prevents injection material at the center of the sprue from being drawn, upon mold opening to remove the molded product.

FIGS. 6 and 7 illustrate a modification wherein the sprue gate comprises a cluster of like small frusto-conical passages 30, at equal angular spacing about the central axis of the sprue. The eccentric offset Δ of the axis of each passage 30 exceeds the maximum radius (i.e., half the diameter $D_3$) of each passage 30, and, therefore, an effective plug region 31 exists at the center of the cluster, to prevent injected material from being drawn from the center of the sprue, upon opening the mold for product removal. This plug region 31, and all other mold body material near the gate cluster, extends to the cavity end-wall surface contour, as at 24', in the manner described at 24 in FIG. 5. The reduced end of each passage 30 terminates at a short cylindrical passage 17", corresponding to the passage 17' of FIG. 5.

While the invention has been described in detail for a preferred embodiment, it will be understood that modifications may be made without departure from the scope of the invention. For example, the gate orifices 20 may be in plurality other than three, and they may be other than sector-shaped.

What is claimed is:

1. In a multiple-part mold for injection-molding of a plastic product wherein the mold parts have contoured wall-surface elements which in their mold-closed condition define a product-molding cavity and wherein a sprue passage in one of said mold parts communicates with one of said surfaces at a gate restriction of effective sectional area less than that of the sprue passage and having a generally central axis of symmetry, the improvement wherein said gate restriction comprises a plurality of restrictive orifices offset from and in angularly spaced relation to said axis, the combined sectional area of said orifices at said one surface being substantially less than that of the sprue passage.

2. The improvement of claim 1, in which said combined sectional area is less than half that of the sprue passage.

3. The improvement of claim 1, in which all said orifices at said one surface are within the axial geometrical projection of the section of the sprue passage.

4. The improvement of claim 1, in which the number of said orifices is three.

5. The improvement of claim 1, in which the sectional areas of said orifices are noncircular at said one surface and are symmetrically oriented with respect to said axis.

6. The improvement of claim 1, in which the gate-restriction orifices are characterized by tapering walls which converge in the direction from the sprue passage to said one surface.

7. The improvement of claim 1, in which the outer contours of all orifices at said one surface are angularly spaced arcs of the same geometrical circle about said axis, said circle being of substantially less included sectional area than that of the sprue passage.

8. The improvement of claim 7, in which the inner limit of each of said orifices is radially offset from said generally central axis of symmetry, to the extent of at least substantially one half the radius of said geometrical circle.

9. The improvement of claim 1, in which the sprue passage converges at its gate end and in which said restrictive orifices are defined by and between adjacent struts of an integrally formed cluster of angularly spaced radial struts.

10. The improvement of claim 9, in which each of said struts is defined by and between a pair of opposed side walls which diverge in the direction of the molding cavity, the divergence being with respect to a plane of symmetry which includes the generally central axis of symmetry.

11. The improvement of claim 9, in which each of said struts terminates at a downstream end which geometrically lies in said one surface.

12. The improvement of claim 1, in which the sectional areas of said orifices are circular, each orifice having a central axis which is offset from said generally central axis of symmetry, the offset in each case exceeding the radius of the orifice.

13. The improvement of claim 12, in which said orifices are frusto-conical, converging in the direction from the sprue passage to said one surface.

14. The improvement of claim 12, in which the body of said one mold part extends to said one surface in the region between said orifices.

* * * * *